US006601433B2

(12) United States Patent
Kriz et al.

(10) Patent No.: US 6,601,433 B2
(45) Date of Patent: Aug. 5, 2003

(54) HAND-HELD PIPETTE

(75) Inventors: Jeffrey W. Kriz, Ossining, NY (US); Richard E. Scordato, Mt. Kisco, NY (US)

(73) Assignee: Vistalab Technologies, Inc., Mt. Kisco, NY (US)

( * ) Notice: Subject to any disclaimer, the term of this patent is extended or adjusted under 35 U.S.C. 154(b) by 0 days.

(21) Appl. No.: 09/873,521

(22) Filed: Jun. 4, 2001

(65) Prior Publication Data

US 2002/0005075 A1 Jan. 17, 2002

Related U.S. Application Data

(60) Provisional application No. 60/214,158, filed on Jun. 26, 2000.

(51) Int. Cl.[7] .................................................. G01N 1/00
(52) U.S. Cl. ........................................................ 73/1.74
(58) Field of Search ............................ 73/1.74, 864.11, 73/864.13, 864.16, 864.18; 422/100

(56) References Cited

U.S. PATENT DOCUMENTS

| | | | | | |
|---|---|---|---|---|---|
| 3,558,014 | A | * | 1/1971 | Wood et al. | |
| 3,732,735 | A | | 5/1973 | Cohen | |
| 3,754,687 | A | * | 8/1973 | Norton | |
| 3,853,012 | A | | 12/1974 | Scordato et al. | |
| 3,933,048 | A | | 1/1976 | Scordato | |
| 3,954,014 | A | | 5/1976 | Andrews, Jr. et al. | |
| 3,991,617 | A | | 11/1976 | Marteau d'Autry | |
| 4,151,750 | A | | 5/1979 | Suovaniemi et al. | |
| 4,164,870 | A | | 8/1979 | Scordato et al. | |
| 4,257,267 | A | | 3/1981 | Parsons | |
| 4,369,665 | A | * | 1/1983 | Citrin | |
| RE32,210 | E | | 7/1986 | d'Autry | |
| 4,790,176 | A | * | 12/1988 | Marteau d'Autry | 73/1.74 |
| 4,821,586 | A | | 4/1989 | Scordato et al. | |
| 4,967,604 | A | | 11/1990 | Arpagaus et al. | |
| 4,988,481 | A | | 1/1991 | Jarvimaki et al. | |
| 5,104,625 | A | | 4/1992 | Kenney | |
| 5,389,341 | A | | 2/1995 | Tunnanen et al. | |
| 5,403,553 | A | | 4/1995 | Heinonen | |
| 5,505,097 | A | | 4/1996 | Suovaniemi et al. | |
| 5,611,784 | A | | 3/1997 | Barresi et al. | |
| 5,970,806 | A | | 10/1999 | Telimaa et al. | |
| 6,090,348 | A | | 7/2000 | Steele et al. | |
| 6,197,259 | B1 | | 3/2001 | Kelly et al. | |
| 6,324,925 | B1 | | 12/2001 | Suovaniemi et al. | |
| 2002/0020233 | A1 | | 2/2002 | Baba et al. | |

FOREIGN PATENT DOCUMENTS

WO WO 01/57490 A1 8/2001

OTHER PUBLICATIONS

"The Automatic Pipette", American Diagnostica, May 2001.
Handi–Pet Pipetting Gun, General Diagnostics, Mar. 1973.
Eppemdorf EDOS 5221, Instruction Manual, Eppendorf, Germany, No Date.

* cited by examiner

*Primary Examiner*—Robert Raevis
(74) *Attorney, Agent, or Firm*—Baker & McKenzie

(57) ABSTRACT

Hand-held pipettes are provided which have automatic volume setting and either manual or power assisted piston operation. Power assisted piston operation may be achieved with a fly-by-wire operation wherein movement of a plunger button is detected and used to control a drive for the plunger. A data transfer capability in at least one direction may also be provided for the pipette.

15 Claims, 3 Drawing Sheets

HAND-HELD PIPETTE

RELATED APPLICATIONS

Figure 1B:
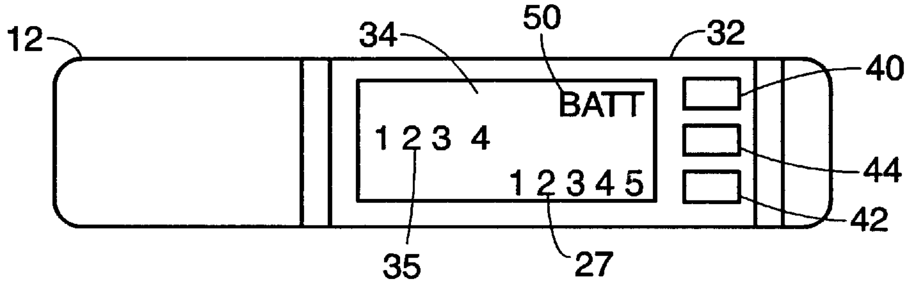

This Application claims priority from provisional application Ser. No. 60/214,158 filed Jun. 26, 2000.

FIELD OF THE INVENTION

This invention relates to hand-held pipettes, and more particularly to improved mechanisms for automatically adjusting volume settings on such pipettes, for "fly-by wire" or power assisted aspirating/dispensing with such pipettes and/or for data transfer therewith.

BACKGROUND

Pipettes may be utilized for aspirating a precise quantity of fluid from a fluid source and for dispensing a precise quantity of fluid to a desired receptacle. Many such pipettes are hand-held, such pipettes heretofore having been of two general types, manual and automatic. Conventional manually-operated pipettes have a manually operated piston connected to a pipette nozzle for creating negative pressure to aspirate fluid into the pipette and for creating positive pressure to dispense fluid from the pipette. The quantity of fluid aspirated is controlled by limiting the stroke of the piston, this generally being accomplished with a manually adjustable piston stop. One problem with such manual pipettes is that it is difficult for the operator to precisely adjust the stop position, this generally being done by rotation of an adjustment knob on the device. The adjustment can also be time consuming, as many as twenty revolutions of the knob being required in order to complete such adjustments. Such pipettes are also difficult to calibrate and volume adjustments on such pipettes cannot be accelerated by presetting commonly used settings into the device.

Automatic pipettes overcome these problems by providing automatic adjustment of the piston stop by, for example, providing a volume input to a processor, which in turn operates a suitable motor or other drive mechanism to precisely control the stop position. The processor may also be utilized for calibration and presets. However, such automatic pipettes also include a motor or other suitable drive mechanism for operating the piston to effect aspiration and dispensing. Since aspiration and dispensing is done frequently, such automatic aspirating and dispensing imposes a high load on the pipette battery, thus requiring large, heavy and expensive rechargeable batteries and/or frequent battery replacement. Such fully automatic pipettes are therefore expensive both to manufacture and to operate. While the battery drain problem for such pipettes could be overcome by having the pipettes operated from line current, users operating in a laboratory or similar setting generally find line cords inconvenient because of the need to move pipettes to different locations in the lab, and nearly all motorized plunger pipettes on the market are therefore battery operated.

In addition, many liquid handling procedures require very precise control of the aspiration and dispensing speeds. At times, different rates may be desired during different stages of the liquid handling operation, something which an operator can easily control when using a manually activated pipette. Thus, in order to adapt to unusual conditions, for example high viscosity liquids, it may be desirable to aspirate slowly and dispense quickly, or to otherwise custom vary the speed of aspiration and/or dispensing. Existing automatic pipettes do not lend themselves to this kind of variability.

However, while fully manual aspiration and dispensing overcomes both the battery life and the control problems indicated above, performing these operations manually also creates problems. For example, particularly for large pipettes and for multi-channel/multi-head pipettes, there can be large drag forces which can require significant force to operate the pipette plunger. This can cause discomfort for the operator and can lead to stress related injuries, particularly for the thumb, which is the finger typically used to operate the plunger. Further, since volume aspirated/dispensed is directly proportional to piston stroke, where small volumes are being dispensed, there can be a very small stroke which makes stroke control difficult. Manual control also eliminates various benefits of automatic operation, including compensation for volumetric errors and high precision/accuracy.

Another limitation on existing hand-held pipettes is that they do not provide a data transfer capability, either into the pipette processor to load calibration data, liquid handling protocols and the like, or from the pipette to download calibration data and/or protocols developed on the pipette to another processor, to a printer or to another appropriate output. The existence of such capability would significantly simplify and speed set up procedures for the pipette and permit protocols developed on the pipette to be saved for future use, capabilities which do not currently exist.

A need therefore exists for an improved pipette device which can be easily and quickly calibrated and adjusted, including the availability of presets, while still putting only a small drain on the device battery so that relatively small and inexpensive batteries can be used while still lasting for periods up to a year in normal use and while permitting precise control of aspiration and dispensing speeds. A need also exists for a pipette which provides the advantages of automatic aspiration/dispensing while still permitting the operator to fully control and vary these operations. Finally, a need exists for a hand-held pipette with data transfer capabilities, preferably in both directions. As indicated above, none of these needs are currently being met.

SUMMARY OF THE INVENTION

In accordance with the above, this invention provides, in accordance with one aspect thereof, a handheld pipette which includes a manually driven piston mechanism for aspirating and dispensing fluid and an automatic volume setting mechanism which includes a stroke control stop for the piston mechanism and a mechanism for automatically setting the stop.

In accordance with another aspect, the invention relates to a handheld pipette which includes a tip receiving nozzle, a manually controlled piston connected to apply negative aspirating and positive dispensing pressure to the nozzle, a stroke control stop for the piston and an apparatus which automatically controls position of the stop, and thus volume of fluid aspirated. The apparatus for automatically controlling the position of the stop preferably includes a stop driving mechanism and a control for operating the drive mechanism. The drive mechanism may include a motor driven worm gear and the control may include a processor, input elements for providing information to the processor and outputs for indicating at least a current volume setting for the stop. The processor may be operative to calibrate the pipette, may include a memory storing presets for stop position and may store and utilize volume compensation algorithms.

The pipette may include a manually operable button and a linkage between the button and the piston for operating the piston. A switch may be positioned to be operated when the button is fully depressed, the apparatus for automatically controlling being operative only when this switch is operated. The apparatus for automatically controlling may also include a mechanism for facilitating rapid change for large stop position changes. The pipette may include a control adapted to store stop settings and data transfer apparatus which facilitates the transfer of stop settings in at least one direction. A power assist mechanism may also be provided for the piston.

In accordance with still another aspect, the handheld pipette includes a tip receiving nozzle, a piston connected to applying negative aspirating and positive dispensing pressure to the nozzle, a plunger button having a selected stroke, a drive for the piston, a plunger button position detector and a mechanism operable in response to the detector for controlling the drive to move the piston at least at a rate and in a direction which are related to that of the plunger button. The piston moving mechanism may include a processor which stores an indication of desired piston stroke, the processor receiving an indication of plunger button position in its stroke from the detector and operating the drive to move the plunger to a corresponding position in its stroke. The pipette may also include a mechanism which facilitates the transfer of pipette data of the processor in at least one direction and may also include an overblow stop detector for the plunger button, the mechanism stopping the drive in response to an output from the stop detector.

Finally, the pipette may include a tip receiving nozzle, a piston connected to apply negative aspirating and positive dispensing pressure to the nozzle, a plunger button, a drive for the piston, a detector for force applied to the plunger button and a mechanism operable in response to the detector for controlling the drive to move the piston at least at a rate and in a direction which are related to detected force applied to the plunger button.

More generally, the handheld pipette may include a tip receiving nozzle, a piston connected to apply negative aspirating and positive dispensing pressure to the nozzle, a manually operated piston actuator, a drive for the piston and a mechanism operable in response to selected operation of the actuator for controlling the drive to move the piston at least at a rate and in a direction which are related to a selected parameter of the actuator. More specifically, the mechanism may be responsive to an actuator stroke and/or force applied to the actuator.

The foregoing in other objects, features and advantages of the invention will be apparent from the following more particular description of preferred embodiments of the invention as illustrated in the accompanying drawings, common elements being given the same or similar references numerals in the various figures.

IN THE DRAWINGS

Figure 1A:
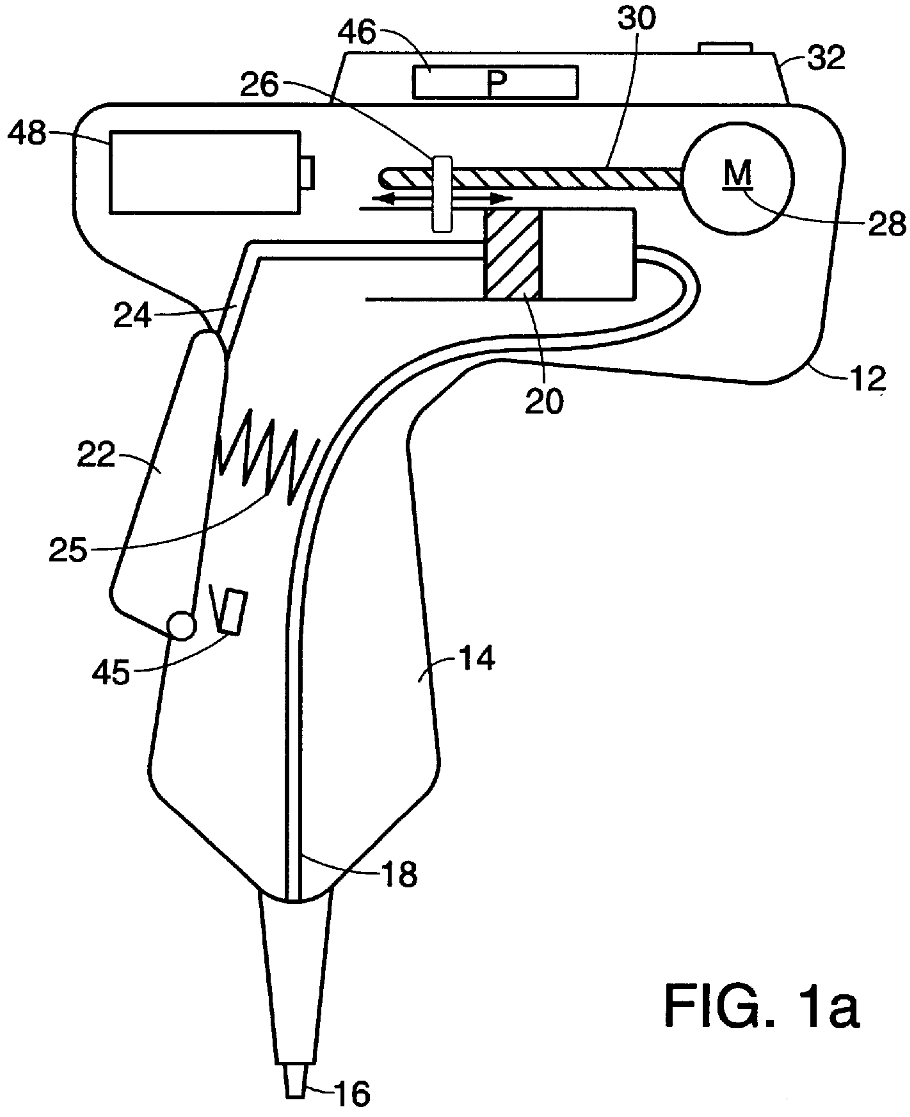
Figure 2:
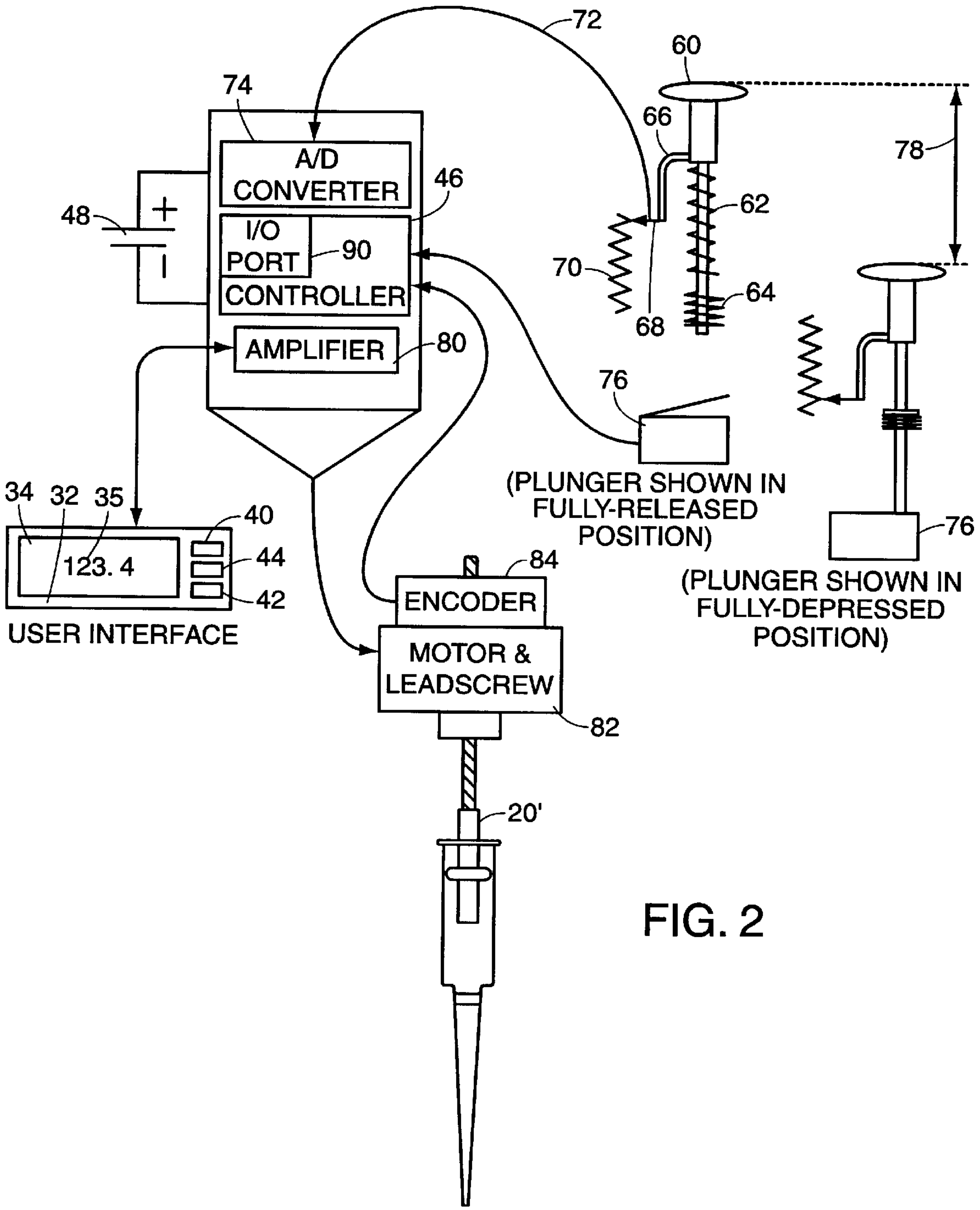

FIGS. 1(*a*) and 1(*b*) are a cut-away side view and a top view respectively of a first illustrative embodiment of the invention FIG. 2 is a semi-block diagram of a second illustrative embodiment of the invention.

Figure 3:
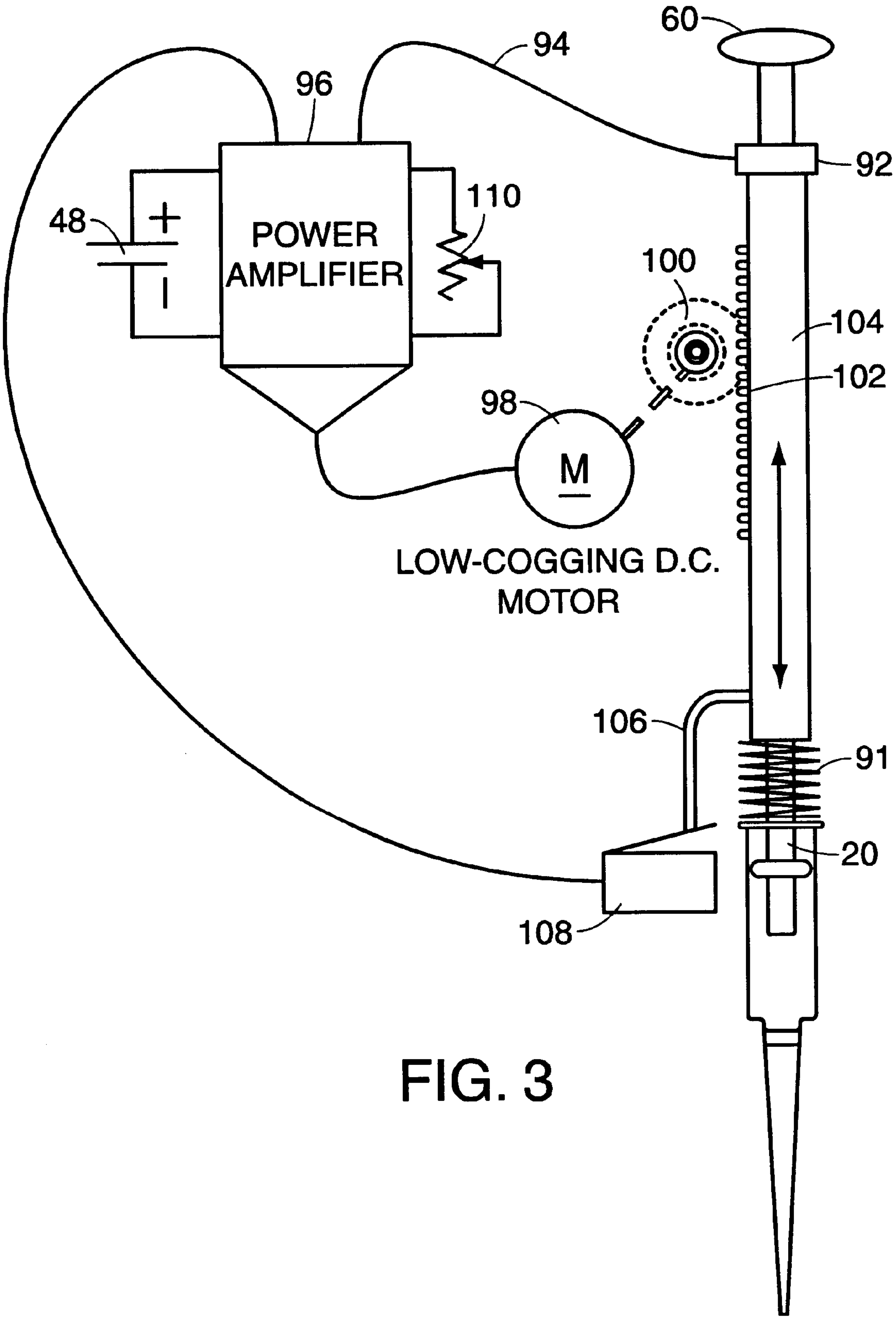

FIG. 3 is a semi-block diagram of a third illustrative embodiment of the invention.

DESCRIPTION OF THE INVENTION

Referring first to FIGS. 1(*a*) and 1(*b*), a pipette embodiment is shown which provides automatic adjustment of the piston stop along with manual control of aspiration and dispensing. This embodiment has a housing 12 with a handle portion 14 having a nozzle 16 extending from the bottom thereof. Nozzle 16 is connected by a length of tubing 18 to a standard piston 20. Piston 20 is mechanically operated by a button 22 on handle 14 connected to piston 20 through a mechanical linkage 24 of a type known in the art. Piston 20 returns to its home position under the influence of a spring, for example spring 25, or other suitable resilient component in a manner known in the art when button 22 is released. The stroke of piston 20 is limited by a piston stop 26. The position of stop 26, and thus the stroke limit of piston 20, is controlled by a motor 28 through a worm gear or other suitable linkage 30.

An illustrative user interface 32 is provided which is best seen in FIG. 1(*b*). Interface 32 includes a display devise 34, a passive reflective LCD display for an illustrative embodiment, which can for example indicate the current volume setting for stop 26. For the illustrative embodiment shown, four, seven-segment digits 35, each with a right-hand decimal point, indicate current volume setting. Preset annunciators 27 and a battery state display 50 are also provided on display 34. Battery state display 50 may for example be a picture of a battery illustrating its charge state (i.e., continuously decrease in size or decrease in discrete increments such as full, half, empty). A plurality of buttons or keys is also provided which may be used for controlling the pipette. For example, buttons 40, 43 and 44 may be a VOLUME UP button, a VOLUME DOWN button, and a SELECT button, respectively. The function of each of these buttons 40–44 is a matter of design choice and, as discussed later, may vary with application. A hidden switch 45 may be provided under button 22 which is activated when the button is fully depressed. For an illustrative embodiment, VOLUME UP button 40 increments the state-specific display parameter, for example volume, by one unit on each momentary press of the switch. If the switch is held depressed for a predetermined time interval, for example one second, the displayed parameter will continuously increment until released. Similarly, VOLUME DOWN key 42 may decrement the volume or other state-specific display parameter by one unit on each momentary press of the key and may continuously decrement this parameter if the key is held depressed for the predetermined time interval, until release. SELECT key 44 allows selection of the stored preset volumes, as well as modification of preset volumes. Preset annunciators 27, for example, numerals 1, 2, 3, 4 and 5 on display 34, represent the stored preset volumes. Plunger-down switch 45 initiates a pipetting stop motion. After selecting a new volume in manners to be described later, the user must fully depress button 22, and thus piston 20, to trigger the movement of piston stop 26. The button must be held depressed for the entire duration of the motion, which could be as long as two seconds, this being necessary to insure that motor 28 does not experience excessive load. By thus unloading the motor during stop movement, a smaller motor may be utilized, resulting in less battery drain.

Interface 32 also includes a processor 46 which would typically be embedded in the interface. Finally, the pipette includes a battery 48 to operate the various components of user interface 32 and to operate motor 28. Since LCD 34 and processor 46 draw minimal current when the processor is on, and since motor 28 is operated infrequently during operation of the pipette, only when volume settings are to be adjusted by moving stop 26, a relatively low power and therefore compact and light battery may be utilized, and battery life in normal usage can extend for a period of up to one year, particularly if processor 46 goes into a sleep mode when not in use. Prior art motorized units generally have a battery life of only a few days of typical use. Battery output is monitored by processor 46 in a manner known in the art and an indication 50 may be provided on LCD 34 when battery 48 is low and needs to be replaced.

User interface 32 has three principal operating states as follows. Additionally, the User Interface has a number of secondary states to indicate various error conditions:

1. Idle: When the controller or processor 46 is in "sleep" mode, the processor is drawing minimum power to preserve the battery. Under these conditions, the displays are all steady (i.e., not blinking). Operation of a selected one of the keys 40–44, for example SELECT key 44, takes the controller out of idle or sleep mode.
2. Adjust: Each time the SELECT key 44 is pressed, the next present annunciator of the preset annunciators 27 is displayed, and the previous one blanked, in the sequence: '1'->'2'->'3'->'4'->'5'-'1', et cetera. As each new preset annunciator is displayed, the volume display numerals change to the value stored in the now-current preset. Each time the UP key 40 or DOWN key 42 is pressed and released, display 35 increments by one unit. If they key is held for more than 0.4 sec, display 35 changes at approximately 10 Hz for 10 counts, then the rate changes to 20 Hz for the next 10 counts. If the key continues to be depressed, the rate increases to 100 Hz until the key is released. After the volume is selected, button 22 must be fully depressed to activate switch 45 in order to cause piston stop 26 to move as required.
3. Calibration: CALIBRATION is a series of sub-states indicated by alpha prompt displays.
   (a) Cal mode selected: Display 35 shows "CAL". Press SELECT key 44—Display 35 shows "tArG" (the mixture of upper and lower case letters for this and other displays is a result of the inability of a seven-segment digital display to reproduce a full alpha character set. The closest approximation for the specified alpha characters is therefore used)—press SELECT again and display 35 switches to numeric display of the default calibration target volume setting.
   (b) The displayed target volume can be adjusted by keys 40 and 42.
   (c) Press SELECT key 44. The display shows "MEAS"; press SELECT again to switch to numeric display of measured volume setting. The initial value will be equal to the target volume. Use keys 40 and 42 to adjust the display to match the measured dispensed amount.
   (d) Press SELECT key 44—Display 35 shows "FACt" until SELECT is pressed again, then switches to a numeric display of the computed calibration factor (e.g., "0.997"). Keys 40 and 42 can be used to adjust the factor as desired before acceptance.
   (e) Pressing SELECT key 44 once again accepts the Cal factor and exits Cal mode: Display 35 shows "SEt". After 1 second, the display reverts to the dispense volume setting.
   (f) CALIBRATE mode can be aborted at any sub-state by fully depressing button 22.

The design of this invention also enables the enhanced accuracy and calibration features of some prior art automatic systems to be achieved in a pipette device with a manually controlled plunger. Thus, in operation, the first thing which needs to be done is to calibrate the pipette. This may for example be done by setting stop 26 for a particular value, for example 100 microliters. This is done by observing the current setting on display 35, and then operating either UP button 40 or DOWN button 42 as appropriate until a desired value appears on display 35. SELECT button 44 may then be operated, indicating to processor 46 that this setting is to be stored. Processor 46 will then operate motor 48 to adjust stop 26 for the indicated volume. However, either initially, or over time due to environmental conditions, wear, and other factors, either the stop position itself or the operation of motor 28 and worm/gear linkage 30 to achieve a stop position for a given volume may vary slightly. Calibration compensates for these errors.

Once the volume value has been entered, a selected number of aspirations are performed, for example five or more, and the actual quantity of fluid aspirated is carefully measured, for example by dispensing the fluid into a suitable measuring vessel. Aspirating and dispensing may be performed in standard fashion. For example, button 22 is pressed to move piston 20 fully into its cylinder. A tip on nozzle 16 is then dipped in the fluid to be aspirated and button 22 released, permitting piston 20 to move back in its cylinder under spring action or the like until stop 26 is reached, thereby aspirating a precise quantity of fluid into the tip. Then tip is then relocated to the sink receptacle and button 22 operated to dispense the fluid. The average of the actual volume measurements is then determined and inputted into processor 46. This may be accomplished for example by pressing/holding buttons 40 and 42 simultaneously for two seconds to place processor 46 in CALIBRATE mode and then inputting the determined actual value via the UP button 40 or DOWN button 42. Processor 46 will then perform a calibration algorithm to determine the correct piston stop position for a given volume, for example the algorithm taught in U.S. Pat. No. 5,024,109 (Romero), to determine the adjustment and stop position required in order to achieve desired volumes. In addition, a motor controlled piston stop enables the processor to perform volume corrections, based for example on ambient temperature, pressure and humidity.

To save time in changing settings between volumes, preset volumes may be loaded into a memory of processor 46. This may be accomplished for example by button 44 also functioning for an illustrative embodiment as a mode switch, double clicking on this button causing processor 46 to move between LOCKED, CALIBRATE and UNLOCKED modes. The mode for the processor can be displayed on LCD 34. Alternatively, a separate mode switch could be provided. When in LOCKED mode, button 40 and/or 42 would be operated to cause a desired preset value to appear on display 34, and button 44 would then be operated to store this value as a preset. In a LOCKED mode, when UP or DOWN button 40 or 42 are operated, processor 46 immediately displays the next higher or next lower, depending on which button is operated, preset value. Another option for speeding operation is for the processor to initially move quickly when a button 40 or 42 is operated until the user momentarily releases the button and then to move slowly when the button is repressed without hitting button 44 to permit precise settings to be obtained. Other methods of achieving fast/slow operation could also be provided.

FIGS. 2 and 3 illustrate embodiments of the invention which provides power assisted aspiration/dispensing. While to simplify these drawings, plunger stop 26 and controls for controlling the position of this stop to select volume settings are not shown, stops could be employed for both embodiments and could be set either manually or automatically, for example using the stop setting mechanism and protocol for the embodiment of FIG. 1. However, for reasons discussed later, such stops are not generally required for at least the FIG. 2 embodiment.

FIG. 2 shows a "pipette-by-wire" embodiment wherein button 60 operated by the user is not directly connected to plunger 20', but instead controls the generation of an analog signal which is utilized by a suitable controller to operate a motor driving the plunger, the rate and direction of plunger movement thus being controlled by the user, but the stroke being independent of plunger stroke or displacement, which are constant for all volumes. More specifically, button 60 is operated against a light bias spring 62 and against a stronger bias spring 64 near the end of its stroke, providing the feel of a two-stroke or overblow action. For example, only spring 62 might be compressed for aspiration, while both springs 62 and 64 are compressed for dispersing, thereby assuring the dispersing of all fluid from the pipette. An arm 66 connected to move with button 60 is connected to movable arm 68 of a potentiometer 70. The analog voltage at arm 68 is applied through line 72 and A/D converter 74 to controller or processor 46. Button 60, when it completes its stroke, acts on homing sensor or switch 76, switch 76 being closed indicating that the plunger has completed its stroke 78 as shown for the dotted button at the right in FIG. 2. Switch 76 being closed also causes a signal to be applied to controller 46.

The plunger position information provided by potentiometer 70 is converted by controller 46 into a plunger position control signal by the processor which signal is applied through amplifier 80 to control motor and leadscrew mechanism 82. Encoder 84 senses and encodes motor position and provides a feedback indication thereof to the controller. As for the embodiment of FIG. 1, a user interface 32 is provided having a display 34 and control buttons 40–44 and a battery 48 is provided to power user interface 32, controller 46, converter 74, amplifier 80, motor 82 and encoder 84.

In operation, button 60 is operated through its full stroke 78 regardless of the fluid volume being aspirated or dispensed, volume being controlled by the setting of controller 46. Since the controller can precisely control the movement of motor 82 and, through feedback from encoder 84, the position of the plunger 20', stop settings are not required for this embodiment, and would generally not be employed. However, while movement of button 60 does not control stroke length of the plunger 20', it does control both the rate at which the plunger is moved and its direction. This permits the operator to aspirate or dispense at a faster or slower rate to control turbulence or for other purposes. Movement of button 60 through its full stroke 78 regardless of volume assures good control by the operator even where small quantities are being aspirated/dispensed. The low resistance of spring 62 also minimizes operator effort for each operation, even for large volume or multi-channel pipettes, thereby substantially reducing operator fatigue and substantially eliminating stress injuries. Finally, the use of controller 46 provides all of the compensation, precision and control features of fully automatic pipettes, while still providing the versatility and control advantages of manual pipettes.

FIG. 2 also illustrates another feature which may advantageously be utilized with all embodiments of the invention, namely a data transfer function. For this embodiment, controller 46 is provided with an I/O port 90 which may be an infra red, RF, optical or other data transfer port either currently used or hereafter used for transfer of data between processors or other equipment. The interfacing with this port could be done using the current IRDA infra red communications standard, the Bluetooth RF communication standard or other communications protocol. Data transfers could be to and from a personal digital assistant (PDA), a PC, directly to a printer or to some other appropriate interfacing device. While transfers could be in only one direction, it is preferable that the port have both upload and download capabilities. Functions which such a port could provide include:

1. Calibration data could be automatically transferred to a printer for record keeping or other purposes.
2. Protocols for running a particular procedure, for example a laboratory test, could be quickly transferred to the pipette controller.
3. Protocols which have been developed on the pipette itself could be transferred to another processor/device for storage, for example for future use, backup or other purposes.
4. Calibration procedures could be either partially or completely automated by using an external computer to calculate correction calibration factors based on a series of liquid dispenses. The dispenses are weighed on a scale to accurately determine volume and the results read by the external processor.

The weights can then be used to calculate calibration factors which are then automatically transferred to the pipette controller.

Many other uses of the data transfer capabilities are also possible.

FIG. 3 shows another embodiment of the invention which provides power assisted pipetting. For this embodiment, unlike that of FIG. 2, plunger button 60 is physically connected to plunger 20 so that aspirating/dispensing is performed much like for the manual embodiment of FIG. 1. However, return spring 91 has a very light force and a transducer 92, for example a piezoelectric force transducer, is positioned to detect pressure applied to the plunger button. An electrical signal indicative of this pressure is applied through line 94 to power amplifier 96, which in turn applies a signal to drive a low cogging d.c. motor 98. Motor 98 rotates pinion gear 100 which interfaces with gear rack 102 on plunger shaft 104. An arm 106 extending from shaft 104 closes overblow stop detect switch 108 when plunger 60 reaches the end of its stroke, the output when switch 108 is closed being applied to amplifier 96 to prevent motor 98 from further driving plunger 60 in the downward direction. The power amplification by amplifier 96, and thus the force applied by motor 98 to plunger 60 is controlled by a force adjust potentiometer 110. Battery 48 can also be connected to power amplifier 96. The embodiment of FIG. 3 thus permits manual pipetting to be performed while requiring the operator to exert little force on plunger button 60, thereby reducing operator fatigue and the incidence of stress related injuries.

While the invention has been described above with respect to various illustrative embodiments, it is apparent that the components shown for these embodiments are for illustration only and that other suitable components might be utilized. For example, various other electrically controlled drives, for example a linear motor, might be substituted for the motor 28, 82 and/or 98 and a number of linkages might be utilized in place of worm gear 30, leadscrew and rack 102 and pinion 100 shown in the figures, the linkage used in each instance being somewhat a function of the drive element utilized. The inputs for the user interface 32 could, in addition to buttons, be wheels, roller balls, a touch sensitive display or, space permitting, a numeric keypad. Other input devices known in the art might also be utilized. Other displays and other mechanical devices for operating piston 20 might also be employed. Position indicators other then potentiometer 70, other overblow detection elements and other encoders might also be utilized. The shape and configuration of housing 10 could also vary with application, as could the position of nozzle 16. Finally, while the head is shown as having a single nozzle and tip for the illustrative embodiments, with suitable modification, the invention could also be practiced with a multinozzle tip, all of which nozzles operate from a single piston through suitable tubing 18. Thus, while the invention has been particularly shown and described above with reference to a preferred embodiment, the foregoing and other changes to form and detail may be made therein by one skilled in the art while still remaining within the spirit and scope of the invention which is to be defined only by the appended claims.

What is claimed is:

1. A hand-held pipette including:

a manually-driven piston mechanism for aspirating and dispensing fluid; and an internal automatic volume setting mechanism which includes a stroke control stop for said piston mechanism and a mechanism for automatically setting said stop.

2. A hand-held pipette including:

a tip receiving nozzle;

a manually controlled piston connected to the tip receiving nozzle to apply negative aspirating and positive dispensing pressure to said nozzle;

a stroke control stop for said piston; and an internal apparatus which automatically controls the position of said stop, and thus the volume of fluid aspirated.

3. A pipette as in claim 2 wherein said apparatus includes a stop drive mechanism, and a control for operating said drive mechanism.

4. A pipette as in claim 3 wherein said drive mechanism includes a motor driven worm gear.

5. A pipette as in claim 3 wherein said control includes a processor, input elements for providing information to said processor, and outputs for indicating at least a current volume setting for said stop.

6. A pipette as in claim 5 wherein said processor is operative to calibrate said pipette.

7. A pipette as in claim 5 wherein said processor includes a memory storing presets for stop position.

8. A pipette as in claim 5 wherein said processor stores and utilizes volume compensation algorithms.

9. A pipette as in claim 2 including a manually operable button and a linkage between the button and piston for operating said piston.

10. A pipette as in claim 9 including a switch positioned to be operated when said button is fully depressed.

11. A pipette as in claim 10 wherein said apparatus for automatically controlling is operative only which said switch is operated.

12. A pipette as in claim 2 wherein said apparatus for automatically controlling includes a mechanism for facilitating rapid change for large stop position changes.

13. A pipette as in claim 2 including a control adapted to store stop settings, and data transfer apparatus which facilitates the transfer of said stop settings in at least one direction.

14. A pipette as in claim 2 including a power assist mechanism for said piston.

15. A pipette as in claim 14 including a manually operated piston actuator, said power assist mechanism being responsive to at least one of actuator position in its stroke and force on the actuator.

* * * * *